United States Patent [19]
Brock et al.

[11] 3,819,118
[45] June 25, 1974

[54] DRIP IRRIGATION

[76] Inventors: Alan James Brock, 26 Strangeway Ter., North Adelaide; Douglas William Fulton, 526 Grand Junction, Angle Park, both of Australia

[22] Filed: Oct. 17, 1972

[21] Appl. No.: 298,230

Related U.S. Application Data
[63] Continuation of Ser. No. 70,786, Sept. 9, 1970, abandoned.

[52] U.S. Cl. ............... 239/276, 239/542, 239/550, 239/DIG. 19
[51] Int. Cl. ............................................. A62c 31/22
[58] Field of Search .......... 239/212, 276, 450, 145, 239/542

[56] References Cited
UNITED STATES PATENTS

| | | |
|---|---|---|
| 3,199,791 | 8/1965 | Chapin ............................. 239/542 |
| 3,586,239 | 6/1971 | Blass ................................. 239/276 |
| 3,587,972 | 6/1971 | Weeth ............................... 239/212 |
| 3,606,166 | 9/1971 | Whear .............................. 239/450 |
| 3,667,685 | 6/1972 | Rinkewich ....................... 239/542 |
| 3,750,956 | 8/1973 | Mastman .......................... 239/276 |

*Primary Examiner*—Lloyd L. King
*Attorney, Agent, or Firm*—Jay L. Chaskin, Esq.

[57] ABSTRACT

Drip irrigation means and method wherein capillary tubes are formed to a coil shape and are either wrapped around a plastic walled secondary distribution pipe or depend from it, the capillary tubes passing through apertures of smaller size in the secondary distribution pipe thereby to be retained by the resilient deformation of the pipe wall, thus enabling the secondary distribution pipe to be more readily handled and enabling any blocked capillary tube to be readily cleared.

16 Claims, 5 Drawing Figures

DRIP IRRIGATION

This application is a continuation of our earlier application Ser. No. 70,786, filed Sept. 9, 1970 now abandoned.

This invention relates to a drip irrigation system, and further it relates to a method of installing a drip irrigation system.

Drip irrigation systems have been proposed wherein a distribution pipe is subdivided into a plurality of short lengths which are interconnected by fittings, each fitting including a male threaded portion contained within a sleeve, the spiral recess formed thereby opening at one end into the distribution pipe and at the other end in a discharge outlet, the spiral recess functioning to limit the flow of water outwardly so that the so called "drip irrigation" can occur locally and avoid wastage of water which in other forms of irrigation merely support weeds adjacent the plants which are to be irrigated. By means of the drip irrigation technique it is possible for high yields to be obtained with the expenditure of a relatively small amount of irrigating water. However the proposed arrangement described above is subject to the disability that a blockage or damage to one of the fittings necessitates cutting the pipe, discarding the fitting and replacing with a further fitting. Attempts which have been made to provide a sleeve which can be withdrawn have not proved satisfactory in the field, partly owing to the rough usage which necessarily occurs.

The main object of this invention is to provide a drip irrigation system wherein a blockage or damage to the metering conduit is very easily and quickly remedied. By utilizing a capillary tube to function as a metering conduit, and by arranging the distribution pipe to have an aperture therein of slightly smaller diameter than the capillarry tube, any blockage which occurs in the capillary tube may be readily cleared by simply withdrawing one end of the aperture and inserting the other end, thus subjecting the capillary tube to a reverse flow. Alternatively the capillary tube may be discarded and replaced, but in either instance the operation is essentially simple and does not involve cutting of the distribution pipe.

It is a desirable feature of a distribution pipe that it may be coiled on a large reel, for example to be transported from one orchard to another, but this has been rendered difficult in some instances wherein the secondary distribution pipe is weakened at the joints at which it is connected to the metering conduits, and in other cases the metering conduits have not been neatly retained to the distribution pipe, and a further object of this invention is to overcome these difficulties and provide means whereby the metering conduits do not interfere with the coiling of a distribution pipe. If the metering conduits are capillary tubes and are of coil shape, they can be arranged to be positioned around the distribution pipe, and in being so positioned will not subject the pipe to danger of fracture (as in the case of rigid fittings between pipe lengths), and will enable the pipe to be quickly and easily coiled and transported. Alternatively the pipe can be dragged in an endwise direction.

A further difficulty which has been found with previously proposed drip irrigation installations has been the difficulty of ensuring that the correct fittings are used at different points over an area, and calculations are required even if the area is flat. In the more usual case of a contoured area however the calculations are frequently incorrectly made and the rearrangement of fittings is frequently a tedious and time consuming job. It is however desirable that the flow rate from each outlet should be substantially the same (subject to minor soil variations) and it will be seen that by use of a coil of capillary tube, a final adjustment of flow rate can be simply effected by merely reducing the length of capillary tube at any outlet point.

According to this invention a drip irrigation system has a main supply pipe, a secondary distribution pipe, joining means joining the secondary distribution pipe to the main supply pipe and placing it in liquid flow communication with the main supply pipe, a series of apertures in the wall of and spaced from one another along the secondary distribution pipe, and a corresponding series of capillary tubes of coil shape and of greater diameter than the respective apertures of said series extending through those respective apertures and sealably retained therein by resilient deformation of the wall of the secondary distribution pipe.

The method of installing a drip irrigation system over an area of land, according to this invention, comprises the steps:

a. joining a secondary distribution pipe to a main supply pipe for liquid flow communication with the main supply pipe, b. piercing the wall of the secondary distribution pipe to form a series of apertures spaced along the pipe, c. winding a series of capillary tubes onto formers, heating the capillary tubes while on the formers to a sufficient temperature and for sufficient time that they retain a coil shape after removal from the formers, the outer diameter of said capillary tubes exceeding the diameter of said pierced apertures, d. removing the capillary tubes from the formers, and e. cutting lengths from the capillary tubes and inserting the tube of each cut length through a respective pierced aperture.

Another problem which is encountered in the installation of irrigation systems is that of joining secondary distribution pipes to a main supply pipe, and in many instances this has been achieved only by the use of high cost fittings, frequently being screw threaded fittings which are inconvenient to use in the field. A further object of this invention is to provide simple means of joining a secondary distribution pipe to a main supply pipe, and in combination with other features this invention may include as a further feature a grommet of resilient material sealably engageable within an aperture in a main supply pipe and sealably engaging around the outer surface of a pipe wall of a secondary distribution pipe so as to constitute adjoining means which will place the secondary distribution pipe into liquid flow communication with the main supply pipe.

Further objects which are satisfied by this invention will become apparent from the following detailed description, and for example it will be seen that the invention makes possible a system of low cost but high efficiency, and further that the use of larger numbers of molded fittings is avoided.

Two embodiments of the invention are described hereunder in some detail with reference to and are illustrated in the accompanying drawings in which.

Figure 1:
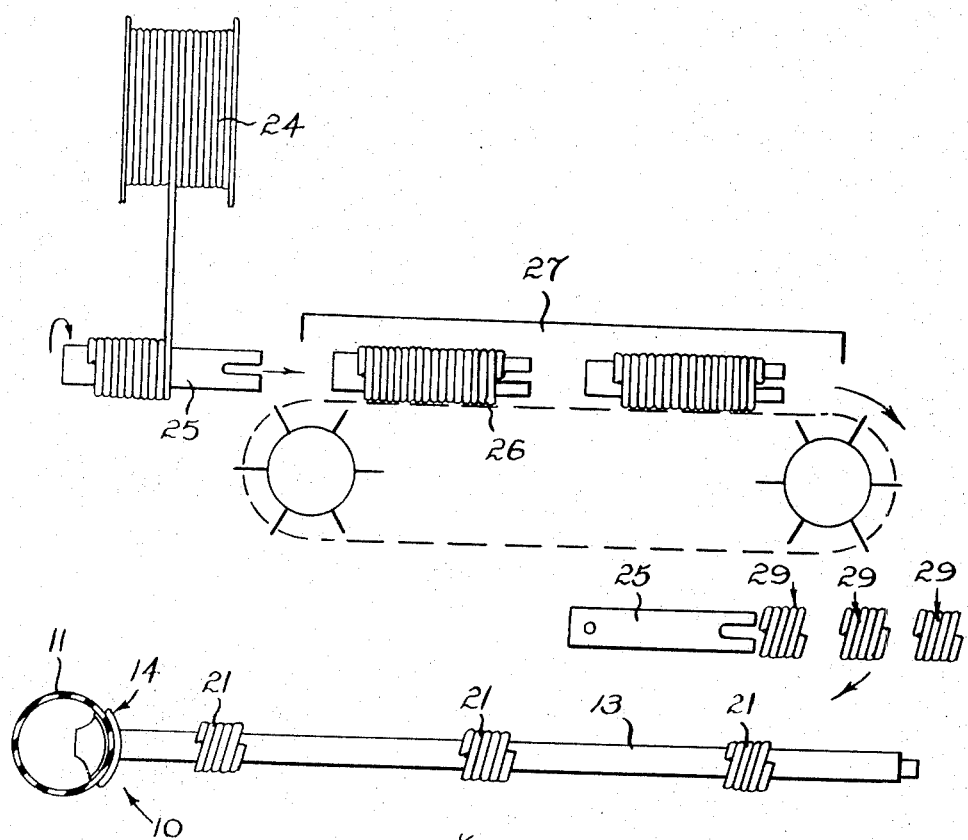
FIG. 1 shows diagrammatically the steps in the forming of capillary tubes and positioning them on secondary distribution pipes.
Figure 2:
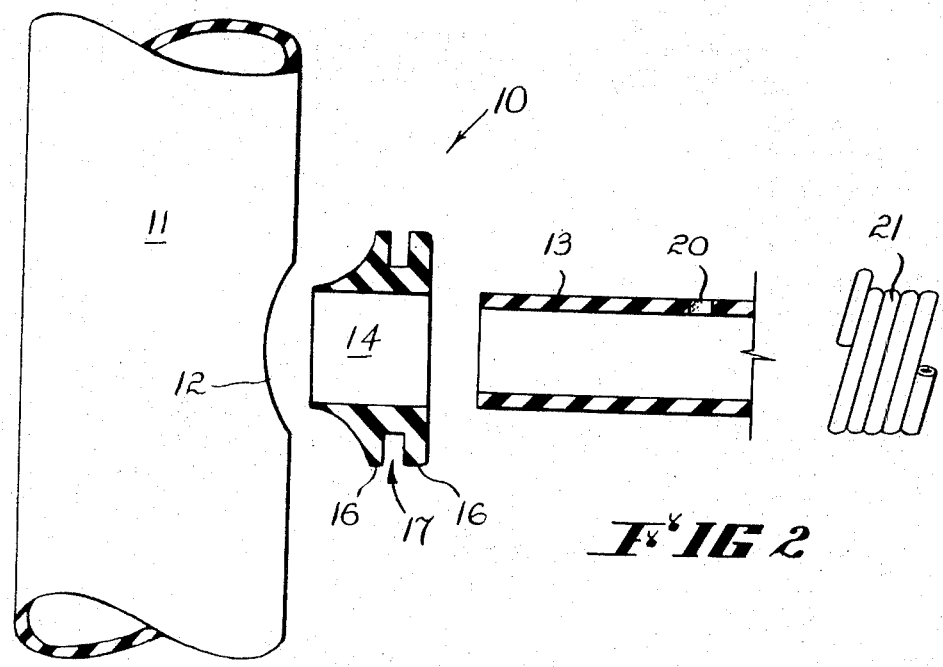
FIG. 2 is an enlarged exploded view of portion of a main supply pipe, a resilient grommet, a secondary distribution pipe and a length of capillary tube.
Figure 3:
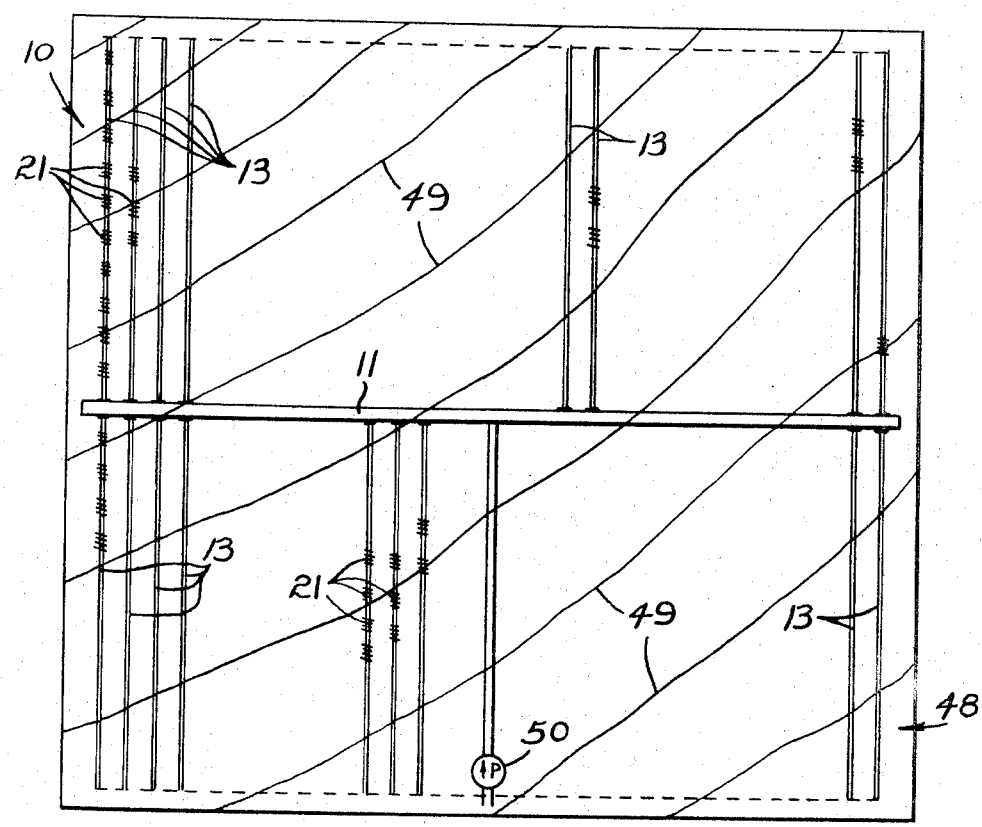
FIG. 3 illustrates an area of land having an irrigation system installed thereon.

In the first embodiment of FIGS. 1, 2 and 3, a drip irrigation system 10 comprises a main supply pipe 11 containing a plurality of apertures 12 in its wall (FIG. 2), a plurality of secondary distribution pipes 13, and a rubber grommet 14 between each secondary distribution pipe and the main supply pipe 11. The rubber grommet 14 is provided with a pair of spaced flanges 16 defining a recess 17 between them, and the arrangement is such that if the grommet is first positioned in an aperture 12 and the end of the secondary distribution pipe 13 inserted thereinto, the resilient deformation of the grommet 14 ensures a sealable engagement both with the main supply pipe 11 and the secondary distribution pipe 13, so that liquid can flow from the main pipe 11 into each secondary distribution pipe 13 without leakage through the joining means 14 within the pressure ranges in which the system is to operate. Pressure ranges are considered to lie within 6 and 22 pounds per square inch in general trickle irrigation work.

Each of the secondary distribution pipes is provided with a series of apertures 20, and a corresponding series of capillary tubes 21 are arranged each with one end projecting through a respective aperture 20, in this embodiment each capillary tube 21 being of slightly larger diameter than the aperture size 20 (a tube 0.100 inches diameter passes through an aperture 0.096 inches diameter to give an interference of 0.004 inches, this being sufficient to ensure a sealable engagement of the tube 21 due to the resilient deformation of the wall of the secondary distribution pipe 13). The secondary distribution pipe 13 is of hard polyethylene, in this embodiment being a Union Carbide grade twenty-five material, which the capillary tubes 21 are of polypropylene which is considerably harder than the polyethylene.

The following chart sets out the number of coils of capillary tube 21 having respective inside diameters of 0.030 and 0.035 inches, for rates between one quarter and 1 gallon per hour and pressures between 6 and 22 pounds per square inch:

| Flow Rate | Inside Diameter | Working Pressure | Number of Coils |
|---|---|---|---|
| ¼ gallon/hour | 0.030" | 6 psi | 14 |
| " | " | 8 psi | 19 |
| " | " | 10 psi | 23 |
| " | " | 12 psi | 27 |
| " | " | 14 psi | 33 |
| " | " | 16 psi | 37 |
| " | " | 18 psi | 42 |
| ½ gallon/hour | 0.035" | 6 psi | 10 |
| " | " | 8 psi | 13 |
| " | " | 10 psi | 17 |
| " | " | 12 psi | 20 |
| " | " | 14 psi | 23 |
| " | " | 16 psi | 26 |
| " | " | 18 psi | 31 |
| " | " | 20 psi | 35 |
| " | " | 22 psi | 39 |
| 1 gallon/hour | " | 6 psi | 4 |
| 1 gallon/hour | 0.035" | 8 psi | 5 |
| " | " | 10 psi | 6 |
| " | " | 12 psi | 7 |
| " | " | 14 psi | 9 |
| " | " | 16 psi | 10 |
| " | " | 18 psi | 12 |
| " | " | 20 psi | 13 |
| " | " | 22 psi | 14 |

It is desirable that the capillary tubes 21 should be of coil shape when free, and as shown in FIG. 1 winding is achieved by the steps of firstly winding tubing from a reel 24 on to a former 25 of nine-sixteenths inch diameter, and placing the former and its tube on to a conveyor 26 which conveys it through an oven 27 wherein the tubing is heated to a temperature of 345°F. for a period of twenty-two minutes. Since the formers are nine-sixteenths inch diameter, the capillary tubes 21 will firmly engage around any pipe exceeding one-half inch inside diameter, as shown in FIG. 1. After the capillary tube has cooled it is cut from the former 25 into lengths which are designated 29 in FIG. 1, and these lengths are initially positioned over the secondary distribution pipes 13 as shown.

Figure 4:
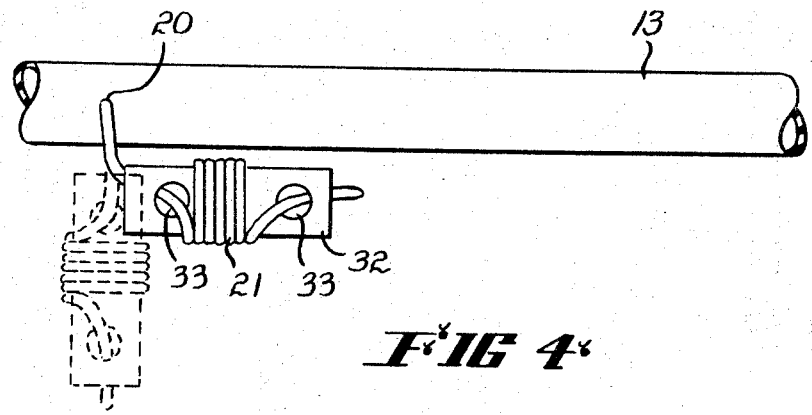
FIG. 4 is a fragmentary view showing a second embodiment wherein the capillary tube is not positioned around a secondary distribution pipe.

On some occasions it is desirable to avoid the use of heat treatment, and in such instances the arrangement as shown in the second embodiment in FIG. 4 can be employed. In this embodiment the capillary tube 21 is wound around a short length of pipe 32 which functions as a support means, the pipe 32 containing a pair of apertures 33 through which the ends of the tube 21 pass so that the pipe 32 retains the tube 21 in its coil shape. If the pipe 13 is suspended (as for example in the case of trellised vines) then this arrangement allows the pipe 32 to depend from distribution pipe 13 as shown dotted in FIG. 4, and this in turn assists in the draining of the pipe 13 since the outlet end of the capillary tube 21 is lower than the pipe 13, and the water contained therein will drain either directly or by syphoning. Alternatively the pipe 32 may be strapped alongside its distribution pipe 13, for example with an adhesive glass tape.

As shown in FIGS. 1 to 4, the coiled shape capillary tubes 21, extend longitudinally in a continuous helical configuration along the longitudinal length of the distributing pipe 13 or the support means 32. The coiling of the capillary tube 21 is about the circumference of the distributing pipe 13 or support means 32.

Figure 5:
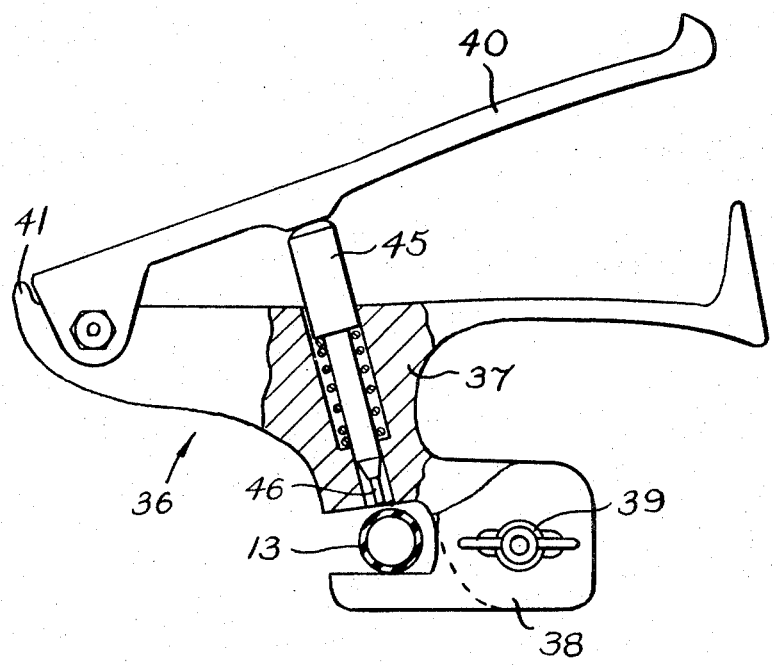
FIG. 5 is a partly sectioned view of a tool for piercing a secondary distribution pipe.

FIG. 5 illustrates a tool 36 which is useful for piercing the secondary distribution pipes 13, the tool 36 being provided with a main frame 37 having an adjustable foot 38 which may be positioned in any one of a plurality of positions to accommodate pipes 13 of different temperatures and locked in that position by a wing nut 39. The main frame 37 has hinged to it a handle 40, an upturned end 41 functioning as stop means to limit opening of the handle 40 while an upturned heel 42 limits closure of the handle 40 toward the main frame 37. The handle 40 bears against a spring loaded pin 45 carrying a punch 46 on its lower end, the punch 46 being pressed downwardly not merely punching an aperture in the wall of a secondary distribution pipe 13 but also deforming the mouth of that aperture inwardly which in turn provides a "lead in" facility for the insertion of the end of a capillary tube 21.

FIG. 3 illustrates an area of land designated 48 on which a system 10 is installed. The area of land is firstly contoured as shown by the contour lines 49, the contour lines conveniently being positioned at intervals of five feet difference in elevation. This provides a ready means to determine the approximate lengths of capillary tubes 21 at various points over the area of land 48 so that initial adjustment can be quickly made by calculation. Such a calculation will take into account the pressure delivered by the pump 50 to the main supply pipe 11, and the pressure drop due to flow through the main line 11 and the secondary distribution pipes 13. Final adjustment of flow rate can be achieved if this is necessary by reducing the lengths of individual capillary tubes 21.

When the system is to be utilized over a small area of land, for example a home garden, only one secondary distribution pipe 13 is utilized this being secured by a joining fitting to a faucet on a water supply line which then constitutes the main supply line.

The materials utilized in the main supply by secondary distribution pipes and capillary tubes may vary widely, but it is deemed desirable that the material of the secondary distribution pipes 13 should be softer than the material of the capillary tubes 21 thus avoiding "necking" of these tubes where they pass through the respective apertures 20.

While there has been described herein the preferred form of the present invention various changes and modifications may be made therein within the scope of the appended claims without departing from the spirit and scope of this invention.

What is claimed is:

1. A drip irrigation system having a main supply pipe, a secondary distribution pipe, joining means joining the secondary distribution pipe to the main supply pipe and placing it in liquid flow communication with the main supply pipe,
   a series of apertures in the wall of and spaced from one another along the secondary distribution pipe, and a corresponding series of capillary tubes having a retained coil shape extending longitudinally in a continuous helical configuration and of greater diameter than the respective apertures of said series, one end of said tubes extending through each aperture and sealably retained therein by resilient deformation of the wall of the secondary distribution pipe.

2. A drip irrigation system according to claim 1 further comprising a joining fitting on the secondary distribution pipe arranged to be secured to a water supply line, said water supply line constituting the main supply pipe.

3. A drip irrigation system having a main supply pipe, a plurality of apertures in the pipe wall spaced from one another along the pipe a corresponding plurality of secondary distribution pipes, joining means in respective apertures sealably engaging said pipe wall and also respective distribution pipes thereby placing the secondary distribution pipes into liquid flow communication with the main supply pipe,
   a series of apertures in the wall of and spaced from one another along each said secondary distribution pipe, and a corresponding series of capillary tubes having a retained coil shape extending longitudinally in a continuous helical configuration and of greater diameter than the respective apertures of said series extending through those respective apertures and sealably retained therein by resilient deformation of the wall of that secondary distribution pipe.

4. A drip irrigation system according to claim 3 wherein each joining means comprises a rubber grommet having a pair of spaced flanges defining a recess therebetween, the dimensions of the grommet being such that the flanges sealably engage the inner and outer surfaces respectively of the main supply pipe, and the apertures extending through the grommet sealably engages the outer surface of the respective secondary distribution pipe.

5. A drip irrigation system according to claim 3 wherein the free inner diameter of the retained coil shape of each said capillary tube is less than the diameter of the secondary distribution pipe carrying said capillary tube, each said capillary tube having at least a portion of the helical configuration engaging around its secondary distribution pipe and having said inner diameter expanded thereby so as to firmly engage and be supported by said pipe.

6. A drip irrigation system according to claim 3 further comprising a short length of pipe supporting each said capillary tube and being connected to the secondary distribution pipe supporting that capillary tube by portion of the length of the pipe, the capillary tube being coiled about the circumference of the short length of pipe.

7. A drip irrigation system according to claim 3 wherein each secondary distribution pipe is of hard polyethylene and each capillary tube is of polypropylene which is harder than said polyethylene.

8. A drip irrigation system according to claim 3 wherein at least a portion of the retained coil shape of the capillary tube extends longitudinally in a continuous helical configuration about the circumference of the secondary distribution pipe.

9. A drip irrigation system according to claim 3 wherein the capillary tube extends longitudinally in a continuous helical configuration for a substantial portion of the retained coil shape about the circumference of the secondary distribution pipe.

10. A drip irrigation system according to claim 8 wherein the free inner diameter of the retained coil shape of each said capillary tube is less than the diameter of the secondary distribution pipe carrying said capillary tube, each said capillary tube engaging around its secondary distribution pipe and having said inner diameter expanded thereby so as to firmly engage and be supported by said pipe.

11. A drip irrigation system according to claim 9 wherein the free inner diameter of the retained coil shape is less than the outer diameter of the distributing pipe, the coil inner diameter being expanded so as to firmly engage the circumference of the distributing pipe.

12. A fluid distribution system comprising a tubular distributing pipe having at least one aperture arranged along the longitudinal length of the pipe and extending through the wall of the pipe, and at least one capillary tube having a retained coil shape extending longitudinally in a continuous helical configuration, one end of the capillary tube being sealably retained in the aperture by the resilient deformation of the wall of the distribution pipe, the inner diameter of the capillary tube being less than the inner diameter of the distributing pipe.

13. A fluid distribution system according to claim 12 wherein at least one turn of the retained coil shape of the capillary tube extends about the circumference of the distributing pipe.

14. A fluid distributing system according to claim 12 wherein the free inner diameter of the coil is less than the outer diameter of the distributing pipe, the coil inner diameter being expanded so as to firmly engage the circumference of the distributing pipe.

15. A fluid distribution system according to claim 12 wherein substantially the entire length of the retained coil shape extends in a continuous helical configuration about the circumference of the distributing pipe.

16. A fluid distribution system according to claim 13 wherein the free inner diameter of the retained coil shape is less than the outer diameter of the distributing pipe, the retained coil shape inner diameter being expanded so as to firmly engage the circumference of the distributing pipe.

* * * * *

UNITED STATES PATENT AND TRADEMARK OFFICE
CERTIFICATE OF CORRECTION

PATENT NO. : 3,819,118
DATED : June 25, 1974
INVENTOR(S) : Alan James Brock et al.

It is certified that error appears in the above-identified patent and that said Letters Patent are hereby corrected as shown below:

[73] Assignee: Uniroyal Pty. Ltd., Edwardstown, South Australia, Australia

Signed and Sealed this

Thirty-first Day of August 1976

[SEAL]

Attest:

RUTH C. MASON
*Attesting Officer*

C. MARSHALL DANN
*Commissioner of Patents and Trademarks*